Nov. 22, 1955  J. W. CLARKE  2,724,325
CUT-HAY RELIEF DEVICE FOR HAY BALERS
Filed Aug. 16, 1952

INVENTOR
Joseph W. Clarke
ATTYS

United States Patent Office 2,724,325
Patented Nov. 22, 1955

2,724,325
CUT-HAY RELIEF DEVICE FOR HAY BALERS

Joseph W. Clarke, Oakland, Calif.

Application August 16, 1952, Serial No. 304,697

4 Claims. (Cl. 100—98)

This invention relates to hay balers of the conventional type, and which are equipped with a hay cutting knife on the plunger, and a cooperating knife across the forward end of the feed hopper at the junction of said hopper with the compression or baling chamber of the baler.

As such balers are constructed at present, there is a tendency for the hay to become jammed when the knives come in contact upon reciprocation of the plunger, and the hay, especially when damp, is frequently mashed or slugged rather than being clearly cut through, so that an excessive amount of power is used, or the output slowed down.

It is, therefore, the principal object of my invention to eliminate or avoid the above objectionable action by the provision of a novel knife and hay relief unit which will prevent jamming at the knives, which is self-cleaning, which will permit wet hay to be handled better and without "slugging," and with which progressive and clean cutting through the mass of hay is assured.

As a further result of the employment of this unit in a baler, back pressure on the plunger at the forward end of the cutting stroke of the plunger is reduced, this reducing the power necessary to operate the baler and increasing the capacity of the baler.

Another object of the invention is to so mount the unit that the possibility of the mounting bolts, if sheared off under an excessive load, from falling into the baling chamber is avoided.

A further object is to provide a unit for the purpose which may be readily installed on a conventional baler, and which is of simple construction and economical of manufacture.

Still another object of the invention is to provide a cut-hay relief device for hay balers which is practical, reliable, and durable, and one which is exceedingly effective for the purpose for which it is designed.

These objects are accomplished by means of such structure and relative arrangement of parts as will fully appear by a perusal of the following specification and claims.

Figure 1:
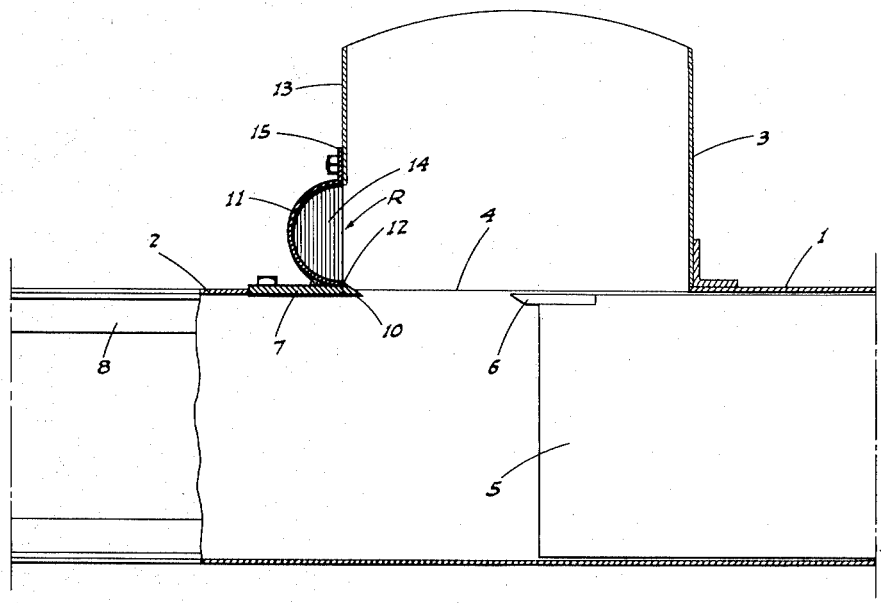
Fig. 1 is a fragmentary sectional elevation of a conventional top-feed hay baler showing the improved hay-relief unit mounted thereon.
Figure 2:
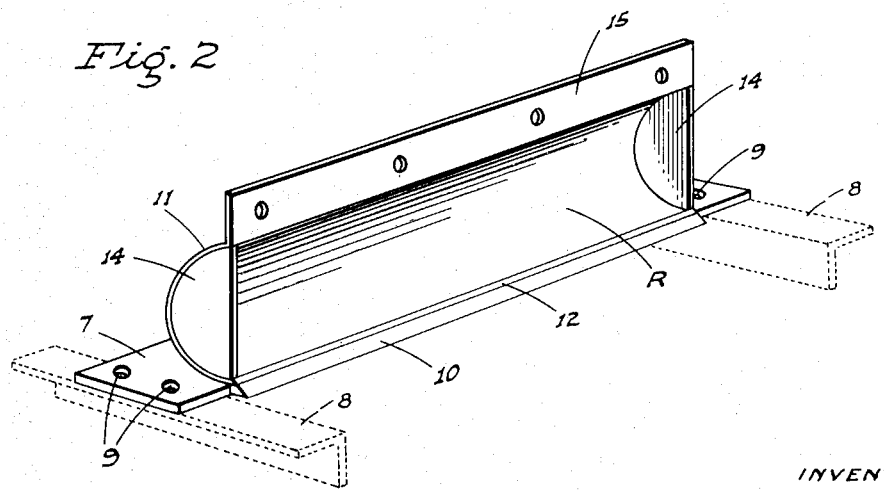
Fig. 2 is a perspective view of the unit, detached.

Referring now more particularly to the characters of reference on the drawings, the hay baler or press 1 includes a rectangular compression or baling chamber 2. At the forward or entry end thereof is the hay hopper 3 providing a feed opening 4 into the chamber.

The plunger 5 is mounted in the press for reciprocation in the usual manner back and forth across the opening 4 and into the adjacent end of the compression chamber; the plunger having a knife blade 6 extending transversely thereof along its edge adjacent the opening 4 and projecting somewhat ahead of the plunger, as usual.

My improved relief unit, which cooperates with blade 6, comprises a bar 7 extending transversely of the press adjacent the forward edge of the opening 4 and adapted to rest at its ends on the side frame angles 8 of the press; the end portions of the bar having holes 9 therethrough so that the bar may be removably bolted to said angles outside the chamber 2.

The bar 7 is formed with a knife-blade portion 10 projecting its rear end and only as wide as the baling chamber 2, said blade portion being thus disposed to cooperate with the plunger blade 6 in the usual manner.

Secured rigid with the bar 7 and extending the full length of the blade portion 10 and projecting outwardly therefrom relative to the press is a relief plate 11. This plate is formed with a substantially semicircular curvature which is concave relative to and faces into the intake hopper 3, the curved plate having a smooth junction with the beveled face of blade portion 10, as shown at 12.

The forward wall 13 of the hopper 3 is cut away for the height and width of the plate 11, as shown in Fig. 1, the concavity of said plate thus opening into the hopper immediately out from opening 4, and forming a transversely extending concavely curved recess R directly above knife 10.

Since said plate is wholly outside the hopper, end walls 14 fill in the concavity of the plate at its ends and enclose the recess R, said walls being rigid with and a part of the unit and alining with the side walls of hopper 3.

A flat flange 15 may be formed with and extend along the curved plate at its outer edge to overlap and abut and be secured against the adjacent uncut portion of wall 13.

It may be noted that a hay bale is formed by a number of successive plunger movements, each of which advances and compresses hay fed into the baling chamber during the previous retracting movement of the plunger, and adds this amount of compressed hay to the portions already compressed and advanced by previous plunger strokes.

Such hay initially projects above the baling chamber somewhat so that there is a certain compression of the hay being advanced above the baling chamber and knife 10 as well as below the same. With the straight forward wall of the feed hopper as previously made, such upper portion of the hay is finally pressed against said forward wall even before the knives engage each other. This causes a back pressure to be exerted against the plunger, and resistance to the further advance thereof is increased. This is especially true when the plunger is on its final bale-forming stroke, and frequently results in the shear pin of the plunger being broken, to replace which, of course, delays the baling operations.

By reason of the recess R now provided in the front wall of the hopper 3, however, the above objectionable features are eliminated, and the portion of the hay above the knife 10, being advanced by the plunger and compressed below said knife, is now free to enter the recess R. Back pressure on the plunger is thus relieved and a clean cut through the hay is made by the cooperative knives, and excess strains on the plunger are avoided.

By reason of the curvature of the recess R, the hay therein and cut off from the main body of hay is upset and falls into the feed chamber when the plunger retracts, and hence does not pile up in the recess to ultimately clog the same.

It will also be obvious that the relief unit may be applied, with equally good results, to side-opening as well as top-opening balers.

It will also be apparent that the unit may be built into a baler at its time of manufacture, or may be easily applied, as an attachment, to a baler already constructed.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a hay baler having an intake hopper, a baling chamber having longitudinal side frame members, there being a feed opening between the hopper and chamber, a plunger movable across the opening and into the chamber, and a knife blade across the forward end of the plunger; a cooperating blade across the baler at the forward edge of the opening, a plate extending transversely of the last named blade for the full width thereof and forming a portion of the forward wall of the hopper and extending from said last named blade outwardly a predetermined distance; said plate being formed with a concave curvature facing into the hopper, and means mounting the last named blade and plate as a unit for attachment to and removal from the longitudinal frame members of the baler.

2. A structure as in claim 1, in which said mounting means comprises a bar rigid with and extending lengthwise of the last named blade and plate and on which said plate is secured to form a unit with the bar and blade; the bar being alined with the blade and projecting at both ends beyond the same for engagement with and mounting on the longitudinal side frame members of the baling chamber.

3. In a hay baler having an intake hopper which includes a forward transverse wall, a baling chamber, there being a feed opening between the hopper and chamber, a plunger movable across the opening and into the chamber, and a knife blade across the forward end of the plunger; a cooperating blade extending across the top of the baling chamber at the forward edge of the opening, and a plate extending transversely of the baling chamber for the full length of said cooperating blade and forming a portion only of said forward wall of the hopper, said plate curving from said cooperating blade outwardly a predetermined distance and being formed with a concave surface facing into the hopper, and the cooperating blade being disposed substantially in alignment with the top of the baling chamber.

4. A structure as in claim 3, in which the curvature of the plate is substantially 180 degrees in extent.

References Cited in the file of this patent

UNITED STATES PATENTS

| | | |
|---|---|---|
| 396,096 | Livengood | Jan. 15, 1889 |
| 1,255,013 | Ireland | Jan. 29, 1918 |
| 1,593,153 | Ambler | July 20, 1926 |
| 2,293,679 | Baker | Aug. 18, 1942 |
| 2,591,970 | Seegers et al. | Apr. 8, 1952 |
| 2,633,691 | Lytle | Apr. 7, 1953 |

FOREIGN PATENTS

| | | |
|---|---|---|
| 828,618 | Germany | Jan. 21, 1952 |
| 873,929 | France | Apr. 13, 1942 |